United States Patent
Pahlavan et al.

(10) Patent No.: US 9,702,970 B2
(45) Date of Patent: Jul. 11, 2017

(54) TIME OF ARRIVAL DELAY CANCELLATIONS

(71) Applicant: Maxim Integrated Products, Inc., San Jose, CA (US)

(72) Inventors: Kourosh Pahlavan, Cupertino, CA (US); Farokh Hassanzadeh Eskafi, Palo Alto, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 548 days.

(21) Appl. No.: 14/263,576

(22) Filed: Apr. 28, 2014

(65) Prior Publication Data

US 2015/0061920 A1 Mar. 5, 2015

Related U.S. Application Data

(60) Provisional application No. 61/872,587, filed on Aug. 30, 2013.

(51) Int. Cl.

| | | |
|---|---|---|
| *G01S 13/74* | (2006.01) | |
| *G01S 13/75* | (2006.01) | |
| *G01S 13/76* | (2006.01) | |
| *G01S 13/93* | (2006.01) | |
| *G01S 5/02* | (2010.01) | |
| *G01S 5/00* | (2006.01) | |

(52) U.S. Cl.
CPC ............ *G01S 13/765* (2013.01); *G01S 13/74* (2013.01); *G01S 13/75* (2013.01); *G01S 13/751* (2013.01); *G01S 13/758* (2013.01); *G01S 13/931* (2013.01); *G01S 5/0009* (2013.01); *G01S 5/0252* (2013.01)

(58) Field of Classification Search
CPC .... G01S 5/0009; G01S 5/0018; G01S 5/0045; G01S 5/0252; G01S 13/08; G01S 13/74; G01S 13/75; G01S 13/751; G01S 13/758; G01S 13/93; G01S 13/931
USPC .... 342/42, 44, 45, 46, 47, 51, 118, 125, 144
See application file for complete search history.

(56) References Cited

U.S. PATENT DOCUMENTS

| | | | | |
|---|---|---|---|---|
| 4,025,791 A | * | 5/1977 | Lennington | G01S 17/74 250/338.1 |
| 4,068,232 A | * | 1/1978 | Meyers | B07C 3/12 342/193 |
| 4,278,977 A | * | 7/1981 | Nossen | G01S 13/79 342/125 |
| 4,438,435 A | * | 3/1984 | Hofgen | G01S 13/787 342/134 |
| 4,837,575 A | * | 6/1989 | Conner, Jr. | G01S 13/78 342/45 |
| 5,126,746 A | * | 6/1992 | Gritton | G01S 13/79 342/125 |
| 5,231,400 A | * | 7/1993 | Mouldin | G01S 13/782 250/332 |

(Continued)

*Primary Examiner* — Peter Bythrow
(74) *Attorney, Agent, or Firm* — North Weber & Baugh LLP

(57) ABSTRACT

The invention relates to a ranging system for measuring the distance between an interrogator and a transponder. The transponder includes: a signal receiver for receiving a challenge signal from an interrogator; a signal processor for processing the challenge signal and generating a response signal in response to the challenge signal; a buffer for storing the response signal generated by the signal processor; and a signal transmitter for sending the response signal stored in the buffer when the signal processor receives a ranging signal from the interrogator, wherein a time interval between the challenge signal and the ranging signal is known to both transponder and the interrogator.

31 Claims, 4 Drawing Sheets

(56) References Cited

U.S. PATENT DOCUMENTS

| | | | | |
|---|---|---|---|---|
| 5,438,332 A * | 8/1995 | Adam | ............... | H04K 1/003 342/18 |
| 5,508,705 A * | 4/1996 | Spiess | ............... | G01S 13/78 342/44 |
| 5,550,549 A * | 8/1996 | Procter, Jr. | ............ | G01S 13/84 342/125 |
| 6,407,695 B1 * | 6/2002 | Stierlin | ............ | H01Q 17/00 342/1 |
| 7,239,264 B2 * | 7/2007 | Cherniakov | ......... | G01S 13/872 342/42 |
| 7,405,662 B2 * | 7/2008 | Steinke | ............ | G06K 7/0008 340/572.1 |
| 7,501,978 B2 * | 3/2009 | Feller | ............... | G01S 13/758 340/10.1 |
| 7,822,424 B2 * | 10/2010 | Markhovsky | ......... | G01S 13/74 455/456.1 |
| 8,229,472 B2 * | 7/2012 | Fireaizen | ............ | G01S 3/48 342/387 |
| 8,594,018 B2 * | 11/2013 | Richards | ............ | G01S 13/825 342/118 |
| 8,736,482 B2 * | 5/2014 | Wu | ............... | G01S 5/10 342/30 |
| 2005/0024256 A1 * | 2/2005 | Ridderheim | ............ | G01S 5/12 342/29 |
| 2005/0068223 A1 * | 3/2005 | Vavik | ............... | H04B 7/155 342/51 |
| 2005/0156777 A1 * | 7/2005 | King | ............... | G01S 3/023 342/29 |
| 2006/0012476 A1 * | 1/2006 | Markhovsky | ......... | G01S 13/74 340/539.32 |
| 2007/0103273 A1 * | 5/2007 | Feller | ............... | G01S 13/758 340/10.2 |

* cited by examiner

TIME OF ARRIVAL DELAY CANCELLATIONS

CROSS REFERENCE TO RELATED APPLICATIONS

This application claims the benefit of U.S. Provisional Application No. 61/872,587, entitled "Time of Arrival Delay cancellation," filed Aug. 30, 2013, which is hereby incorporated herein by reference in its entirety.

BACKGROUND

A. Technical Field

The present invention relates to systems for ranging and determining locations of objects, and more particularly, to systems for determining distances based on measured time of flights.

B. Background of the Invention

A simple ranging system, such as radar, is composed of an interrogator and a reflector. The distance to the reflector is determined by measuring the time of flight of a signal transmitted from the interrogator to the reflector and back to the interrogator. The time of flight will then represent twice the distance between the interrogator and the reflector. An advanced ranging system, however, requires authentication and data communication between the interrogator and the reflector that cannot per definition, remain a simple reflector, but a transponder capable of authentication, receiving, processing and retransmission of data.

Since, in ranging and location determination, the propagation times of the signals are among the essential data that determine range and location, in such applications, there is a fundamental need to maintain a tight control over actual propagation times. To do so, all other delays, e.g. processing times, in the forward and backward links as well as inside the transponders, need to be accounted for. The conventional ranging systems have difficulty in measuring these delays due to unpredictability and unreliability. Thus, there is a need for a system that has a mechanism for eliminating these delays, to thereby enhance the accuracy in determining the propagation times of the signals.

SUMMARY OF THE INVENTION

According to one aspect of the present invention, a transponder of a ranging system includes: a signal receiver for receiving a challenge signal from an interrogator; a signal processor for processing the challenge signal and generating or retrieving a response signal in response to the challenge signal; a buffer for storing the response signal generated by the signal processor; and a signal transmitter for sending the response signal stored in the buffer when the signal processor receives a ranging signal from the interrogator, wherein a time interval between the challenge signal and the ranging signal is calculable or a priori known by both transponder and the interrogator.

According to another aspect of the present invention, an interrogator of a ranging system, comprising: a signal transmitter for sending a challenge signal and a ranging signal to a transponder, wherein a time interval between the challenger signal and the ranging signal is calculable or a priori known by both transponder and the interrogator; a signal receiver for receiving a response signal from the transponder; and a signal processor for determining a time of flight based on the challenger and response signals to thereby calculate a distance between the interrogator and the transponder.

According to another aspect of the present invention, a method for operating a transponder of a ranging system includes: receiving a challenge signal from an interrogator; processing the received challenge signal to generate a response signal, if this response is not pre-calculated; storing the generated response signal in a buffer; receiving a ranging signal from the interrogator upon lapse of a time interval from receipt of the challenge signal, wherein the time interval is known to or calculable by both the transponder and the interrogator; and sending the stored response signal to the interrogator upon receipt of the ranging signal.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
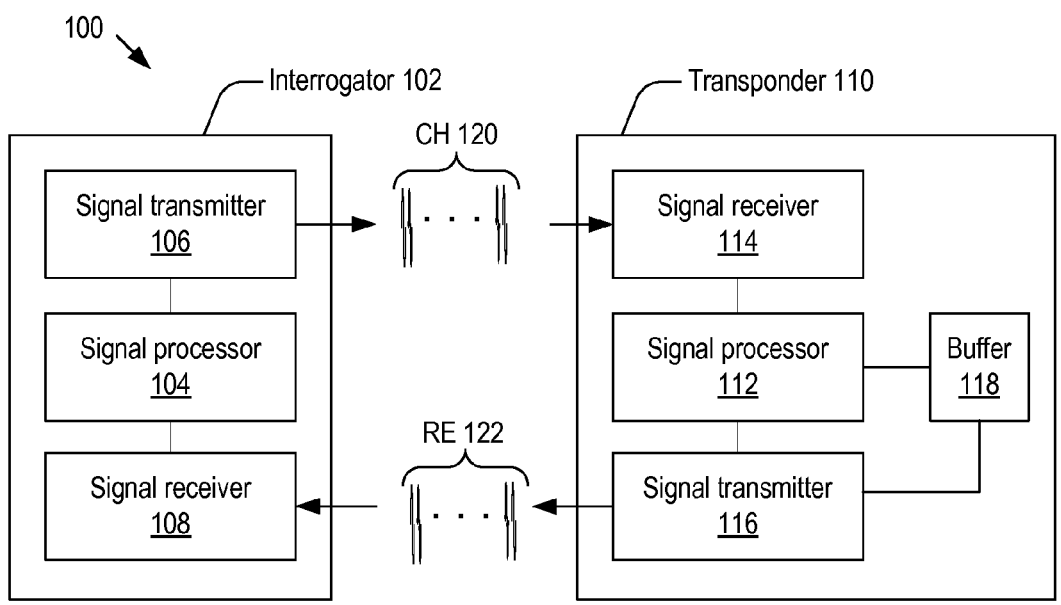
FIG. 1 is a schematic diagram of a ranging system having an interrogator and a transponder according to one embodiment of the present invention.

In the following description, for the purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

A reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Furthermore, one skilled in the art shall recognize: (1) that certain steps may optionally be performed; (2) that steps may not be limited to the specific order set forth herein; and (3) that certain steps may be performed in different orders, including being done contemporaneously.

The present invention relates to ranging and location determination by means of calculating time of flight in propagation of acoustic/electromagnetic waves. In ranging systems, the surest way of measuring range is for the responder to reflect/retransmit the received signal immediately without introducing any unknown delays in the response. The conventional ranging systems have the problem of timing uncertainties that inevitably arise in a more complex response or in cases where the response requires certain computational time. Unlike the conventional systems, the present invention discloses a timing protocol that decouples the processing time needed for computation and authentication in the transponder from the actual signal propagation time used for ranging. Decoupling large and inaccurately predictable delays from the signal propagation times provides a reliable signaling scheme for the interrogator to calculate time of flight, to thereby determine the range to the transponder.

Figure 2:
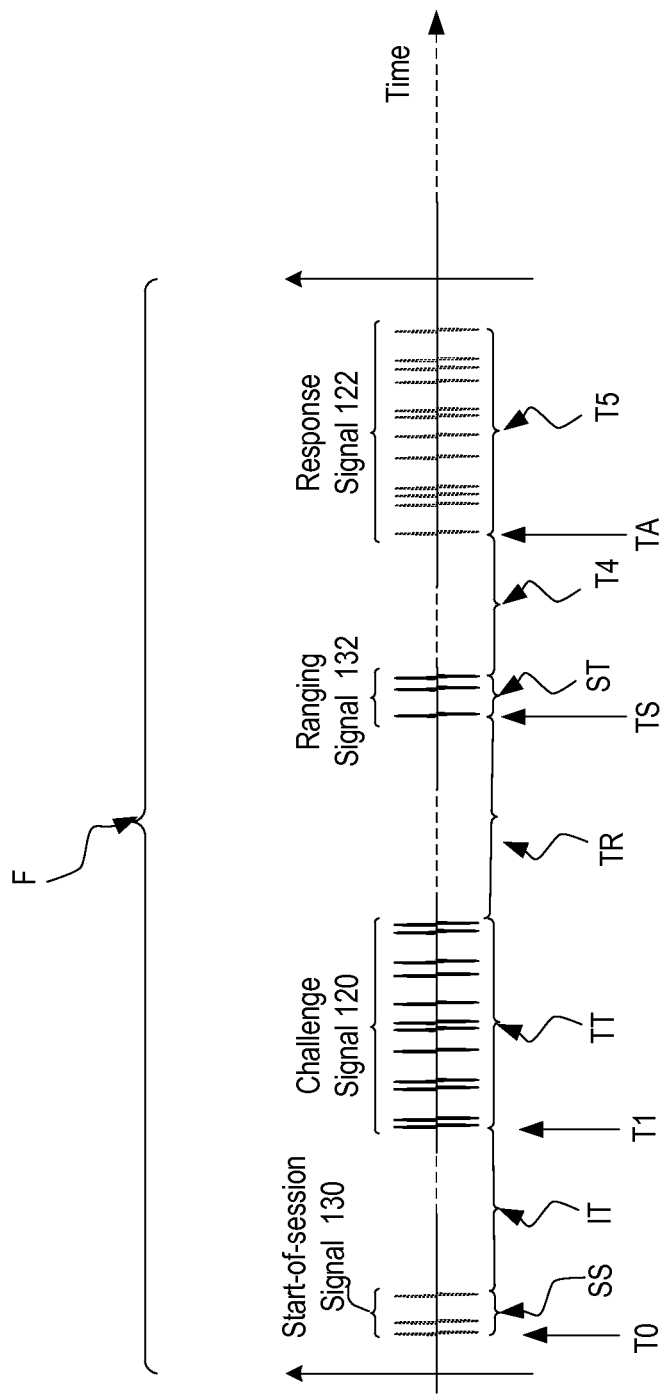
FIG. 2 illustrates a sequence of signals exchanged between the interrogator and transponder in FIG. 1 according to one embodiment of the present invention.

FIG. 1 is a schematic diagram of a ranging system 100 having an interrogator 102 and a transponder 110 according to one embodiment of the present invention. FIG. 2 illustrates a sequence of signals exchanged between the interrogator 102 and the transponder 110 in FIG. 1 during a time interval, F. It is noted that the interrogator 102 and the transponder 110 may have other electronic components. Also, the components in the interrogator 102 and the transponder 110 can be replaced by other suitable electronic components.

In embodiments, at time T0, the transponder 110 may initiate a communication session with the interrogator 102 by transmitting an identification or start-of-session signal 130 to the interrogator 102 during a time interval SS. The transponder 110 announces itself in one or a sequence of symbols to the interrogator 102 during the time interval IT+SS, where the time interval IT is the time interval between the end point of the start-of-session signal 130 and the beginning point of the challenge signal 120. (Hereinafter, the term signal refers to one or a sequence of electric signals and/or one or a sequence of symbols.) Then, the interrogator 102 sends a challenge signal (or, shortly, CH signal) 120 in the form of one or a sequence of symbols during the time interval TT. More specifically, a signal processor (or, equivalently, signal processing unit) 104 of the interrogator 102 causes a signal transmitter 106 to send the CH signal 120 to the transponder 110. In embodiments, if the interrogator 102 does not already know about the response signal (or, shortly, RE signal) to be received from the transponder 110, it may calculate the RE signal and store the calculated RE signal in a suitable storage.

Alternatively, a communication session may start at time T1 when the interrogator 102 sends the CH signal 120 to the transponder 110, i.e., the step of transmitting the start-of-session signal to the interrogator 102 may be skipped.

The CH signal 120 travels a certain distance D to the transponder 110 and is received by a signal receiver 114 of the transponder 110. A signal processor (or, equivalently, signal processing unit) 112 of the transponder 110 decodes the CH signal, calculates a RE signal to it, and keeps the RE signal 120 ready in a buffer 118. All operations onboard the transponder 110 are finished by the end of a time duration TR in FIG. 2.

To keep the communication turn-around time as efficient as possible, it is important for the interrogator 102 to have a good estimate of TR. In most cases, TR can be deterministically calculable and padded by variations caused by accumulated jitter in the chain of calculations or any additionally needed padding for any reason. TR is the time interval during which the transponder 110 is allowed to complete processing the received CH signal and the RE signal, and the value of TR is known or calculable by the interrogator 102 before the period TR expires, preferably before the session has started.

At time TS, which is the end point of the time interval TR, the signal transmitter 106 of the interrogator 102 transmits a ranging signal (or, equivalently, a constellation of symbols) 132 during a time interval ST. Time TS is chosen such that TS is equal to or greater than TR. As discussed above, TR is the time between the challenge signal 120 and the ranging signal 132, and is set by the interrogator 102 so that the transponder 110 can complete signal processing and/or whatever activities the transponder 110 is engaged in. The ranging signal 132 provides the actual timing signal that is immediately responded to by the transponder 110. Upon receipt of the ranging signal 132 at TS, the signal receiver 114 sends a signal to the signal processor 112 and, subsequently, the signal processor 112 causes the signal transmitter 116 to send the RE signal 122 stored in the buffer 118. The signal transmitter 116 transmits the RE signal 122 to the signal receiver 108 of the interrogator 102.

At time TA, the signal receiver 108 of the interrogator 102 starts receiving the RE signal 122 from the transponder 110 and the entire RE signal 122 is received during the time interval T5. Then, the time of flight, T, can be calculated by $$T=(TA-TS)/2-TC, \quad (1)$$

where TC is a calibration time needed for compensating miscellaneous processing times in the response chain of the transponder 110, such as delays in the receiver frontend, symbol decoding, etc. Since TC is typically short and predictable, its jitters and variations are not expected to have a major impact on the timing accuracy, where TC can be negative or positive.

It is noted that the RE signal 122 is calculable or known to both the interrogator 102 and the transponder 110. When the interrogator 102 receives the RE signal 122, the interrogator 102 compares the received RE signal 122 against the RE signal stored in the interrogator 102. Upon affirmative answer to the comparison, the measured distance can be associated to the transponder 110 based on the time of flight, T.

It may be possible that the ranging signal 132 can be generated by an intruder rather than the transponder 110 associated to the interrogator 102. For instance, the intruder may receive and decode the CH signal 120 and send the RE signal 122 when he receives the ranging signal at the time TS. By this process, the intruder can deceive the interrogator 102 to believe that the intruder is an authorized transponder 110 and get access to the interrogator 102. This problem may be remedied by making TS a function of a secret between the interrogator and the transponder, e.g. the response itself:

$$TS=TT+TR+f(RE), \quad (2)$$

where f(RE) represents a function of the RE signal 122.

In embodiments, f(RE) in equation (2) is an additional time delay between the challenge signal 120 and the ranging signal 132, and is known only to the interrogator 102 and the transponder 110. Since this function value is known only to interrogator 102 and the transponder 110, the transponder 110, but not the intruder, knows exactly when to expect the arrival of the ranging signal 132. It means that the intruder, even if it can decode the CH signal 120 and send the RE signal 122 before the authorized transponder 110 sends the RE signal 122, the intruder remains incapable of hijacking the link and altering the time of flight. This is especially true if the transponder 110 initiates the session by transmitting the start-of-session signal 130. In this case, as discussed above, the transponder 110 starts the session by sending out a start-of-session signal 130 to which the interrogator responds by sending its CH signal 120 starting at T1. At the time of receiving the CH signal 120, the transponder 110 knows the time of flight between itself and the interrogator and can consequently and exactly calculate when to expect the time of flight component of the TS signal as it is the same as SS+IT less the a priori known delay for processing a response in the interrogator 102.

In embodiments, the above scheme does not necessarily require that the CH signal 120 and the RE signal 122 constitute a sequence of symbols or are communicated in a burst. Both the CH and RE signals can be communicated one or more symbols at a time, and as such, a sequence of sessions may build up a longer sequence of the CH and RE signals. Furthermore, any RE symbol, and not necessarily the first symbol, can be individually used as a time reference for TA, if the position of that symbol can be estimated. In such a case, TA may need an equivalent adjustment. The latter is useful, when, for example, poor signaling conditions result in the loss of some symbols, but the total data can still be accepted or reconstructed by a suitable method, such as error correction. The ranging signal 132 may or may not be a constellation of multiple symbols. In embodiments, it may represent a value by being composed of multiple symbols, where the value may further represent yet another layer of security by containing a value that is the function of the RE signal or another secret verifiable by both parties. This is also true for the start-of-session signal 130 at T0 that may be as simple as a preamble, an identifier or a more complex secret trigger for the interrogator 102 to attend to.

The ranging system 100 may have various applications, such as keyless entry application, where, regardless of the physical communication link, a security protocol needs to be observed and other data processing is to be expected. In general, keyless entry systems suffer from a certain class of intrusion attacks, where the attacker typically relays the key fob data remotely to the vehicle interrogator. It is therefore crucially important for such systems to use ranging as means of figuring out whether their matching key fob is physically at or near the vehicle.

In a conventional keyless entry system equipped with a ranging system, the vehicle's interrogator may need to calculate its distance to the key fob. The interrogator transmits a challenge question (or, equivalently, challenge signal) to the key fob claiming to be its righteous match. The key fob receives the challenge signal, generates a response signal expected by the interrogator and transmits it back to the interrogator. The key fob must identify itself by providing the correct response and a correct response needs to be, or to be linked to, the signal whose time of flight is measured. However, compared to the fast time of flight for the signals, the process of calculating the proper response to the challenge may be much slower. The calculation time cannot be simply subtracted from the total elapsed time because the calculation time may not be fully or easily predictable. Even if the calculation itself is predictable in terms of time, the length of the calculation generates group delays in the circuits and computational blocks that exceed the tolerances in measuring the time of flight. Furthermore, any longer delays may expose the link to the risk of being hijacked by a faster computing intrusion attack that may produce the illegitimate response faster.

Figure 3:
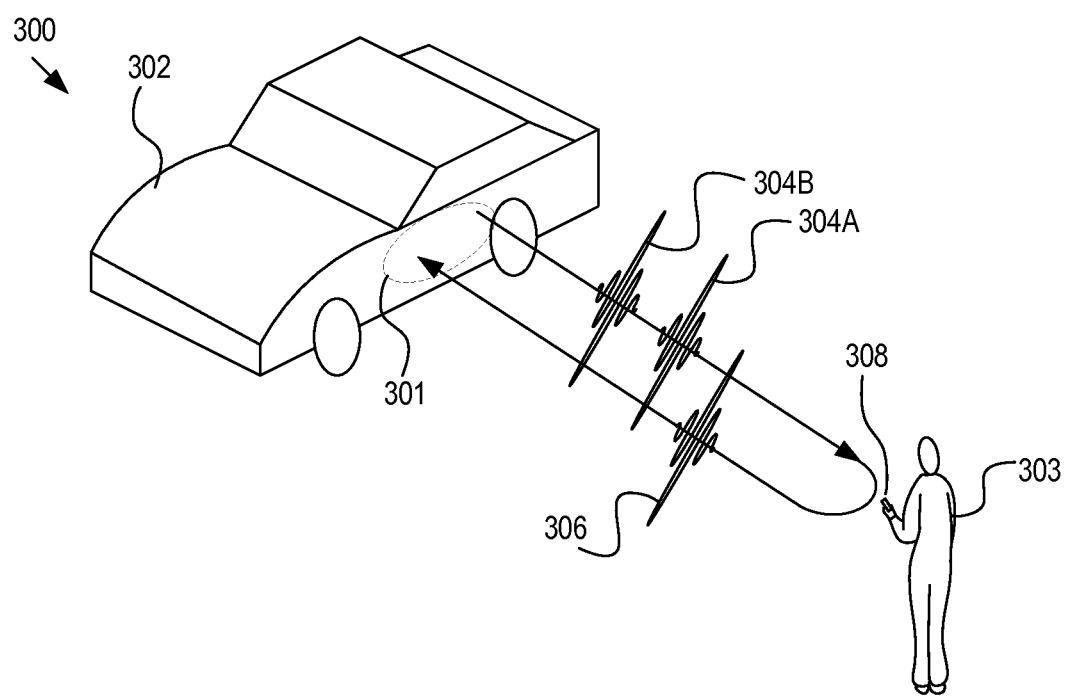
FIG. 3 illustrates a keyless entry system according to another embodiment of the present invention.

Unlike the conventional keyless entry system, embodiments of the present invention provide a protocol that guarantees a simple timing scheme that is processing time agnostic and immune to external attacks. FIG. 3 illustrates a keyless entry system 300 according to another embodiment of the present invention. As discussed above in conjunction with FIGS. 1 and 2, either the key fob 308 or the interrogator 301 initiates the session, i.e., the key fob 308 may send a start-of-session signal (such as 130) to start a communication session or an interrogator 301 inside a vehicle 302 may initiate the session.

In embodiments, the interrogator 301 picks a CH value, time delay TR, and, optionally, calculates another time delay f(RE) as discussed in conjunction with equation (2). In response to the key fob's session start, or proactively, the interrogator 301 may transmit the challenge signal 304A in a suitable form of electromagnetic or acoustic signals, such as ultra-wideband (UWB) impulses, to the key fob 308 of the user 303.

The key fob 308 receives the challenge signal 304A, calculates a response signal and, optionally, the corresponding f(RE), and stores the response signal in a buffer (not shown in FIG. 3). Then, in response to a ranging signal 304B from the interrogator 301, the transponder of the key fob 308, which is waiting for the ranging signal 304B, immediately reacts to it by transmitting the RE signal 306 to the interrogator 301. Then, the interrogator 301 may measure the time of flight based on equations (1), to thereby calculate the distance between the vehicle 302 and the user 303. If the time of flight confirms that the authorized key fob 308 is in the vicinity of the vehicle 302, it accepts the pairing and be ready for further actions associated with the general scheme of keyless entry. In embodiments, knowing the distance to the user 303 may enable a host of services beyond what is traditionally associated with keyless entry; all such services benefits from the disclosed invention.

In embodiments, the signals 304A, 304B, and 306 are generated and exchanged between the interrogator 301 and the transponder of the key fob 308 in accordance with the signal sequence in FIG. 2. The interrogator 301 challenges the key fob 308 with a question (i.e. CH signal), answer (i.e. RE signal) to which is calculable by, or known to, the interrogator itself. The maximum calculation time TR, which is required for calculation of the response by the key fob 308, is also known to the interrogator 301. After the interrogator 301 puts the question 304A to the key fob 308, it waits TR time interval and then transmits a second signal 304B (which corresponds to the ranging signal 132 in FIG.

2) that triggers the key fob 308 to transmit its now precalculated response signal. This second signal 304B is the starting time reference for calculating the total time of flight for the signal going from the interrogator 301 to the key fob 308 and back from the key fob to the interrogator. The second signal 304B eliminates the need for the interrogator 301 to exactly know of how much time it takes for the key fob 308 to process its received data before a response or the need to model group delays in the computation of the response, etc.

In embodiments, the time TS in FIG. 2 may be prolonged by a time interval f(RE) in equation (2), where f(RE) is a preset function of the response signal or yet another secret value. After producing the response signal, the key fob 308 also calculates f(RE) and responds only to signals received at time TS in equation (2). This scheme guarantees that, even if an intruder is capable of calculating a response ahead of time, it cannot use this time advantage to compensate for its longer relayed time of flight. This scheme is especially effective if the key fob initiates the session so as to acquire an estimate of its distance to the vehicle first. The key fob 308 can then share its perceived distance to the vehicle and the vehicle will not authorize any signal that is vastly different from the key fob's perceived distance.

In embodiments, the ranging signal (or, equivalently, constellation) 132 also contains data that can be yet another function of the RE signal 122, such as g(RE), or a different shared secret. The constellation 132 may also be a simple value that helps differentiate it from noise and, by virtue of being simple, may not introduce additional unpredictability of the time needed to decode it in the key fob receiver. To measure the time of flight, the utilized communication link needs to be physically capable of offering enough resolution. As discussed above, one very practical technology for measuring time of flight is the Ultra-wideband radio (UWB). UWB can be used as at least one of the means of communication between the user 303 and the vehicle 302. UWB impulses are used in the system 300, but it should be apparent to those of ordinary skill in the art that any other suitable signaling scheme, such as acoustic, optical and radio communication systems, may be used in the system 300. It is also noted that the ranging system 100 may be applied to other suitable system as well as the keyless entry system 300.

Figure 4:
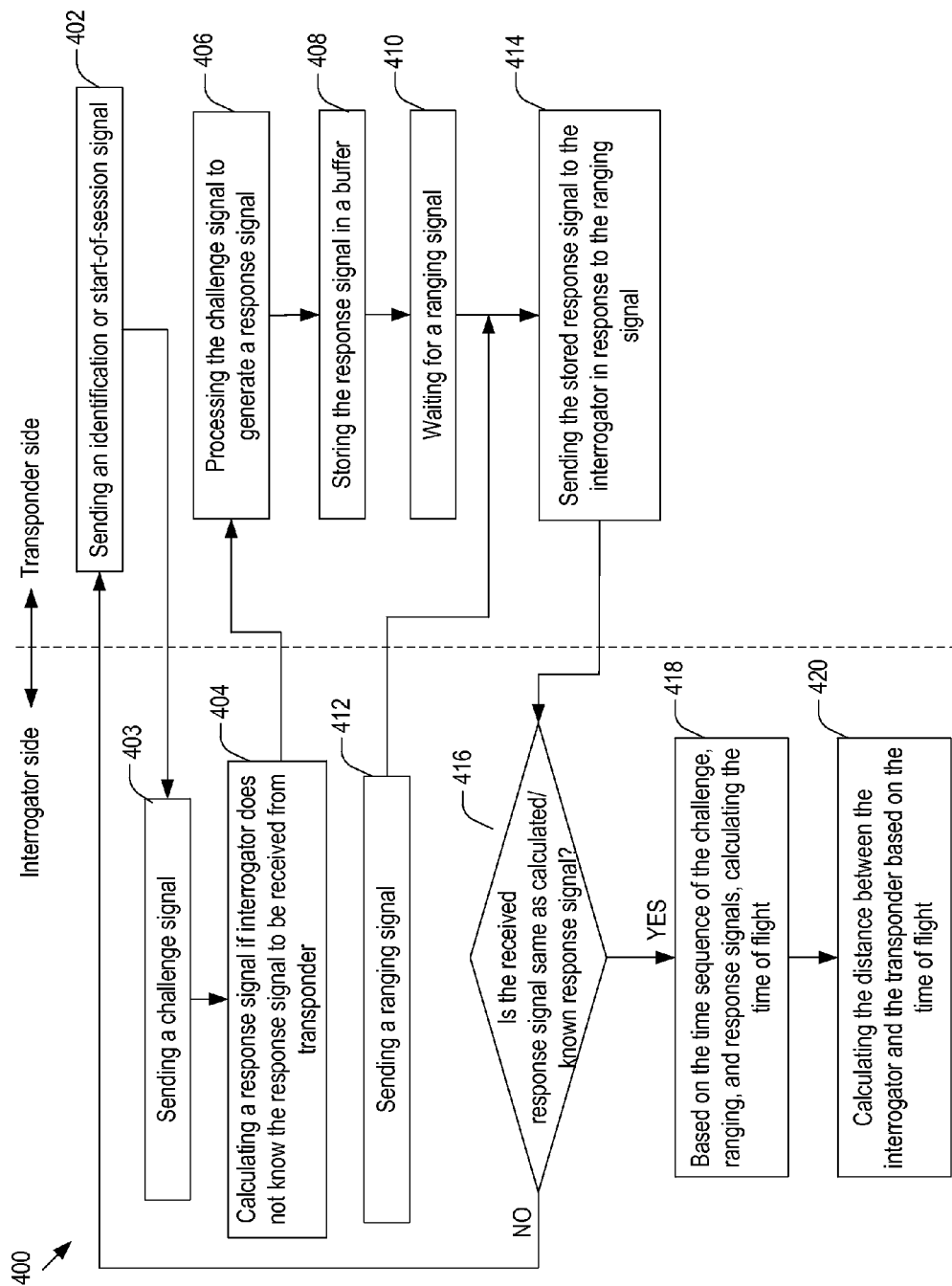
FIG. 4 is a flowchart of an exemplary process for operating the ranging system in FIG. 1 according to another embodiment of the present invention.

FIG. 4 shows a flowchart 400 of an exemplary process for operating the ranging system 100 in FIG. 1 according to another embodiment of the present invention. Optionally, at step 402, the transponder 110 sends an identification or start-of-session signal 130 during a time interval SS to initiate a communication session with the interrogator 102. The transponder 110 announces itself in one or a sequence of symbols to the interrogator 102 during the time interval IT+SS. Then, at step 403, the interrogator 102 sends a CH signal 120 to the transponder 110. Optionally, if the interrogator 102 does not know the RE signal to be received from the transponder 110, it may calculate the RE signal at step 404.

At step 406, the transponder 110 processes the CH signal 120 and generates a RE signal 122. Next, at steps 406 and 408, respectively, the transponder 110 stores the RE signal 122 and waits for a ranging signal 132. The waiting period, which corresponds to the time interval TR in FIG. 2, is known to both the interrogator 102 and the transponder 110. Upon receipt of the ranging signal 132 from the interrogator 102 at step 412, the transponder 110 immediately sends the stored RE signal 122 to the interrogator 102 at step 414.

At step 416, the interrogator 102 determines whether the received RE signal 122 is the same as the expected RE signal, where the expected RE signal is known to or calculated by both the interrogator 110 and transponder 110 in advance. For instance, as discussed above, if the interrogator 110 does not know the RE signal, it may calculate the RE signal at step 404.

Upon negative answer to the step 416, the process 400 proceeds to step 402. Otherwise, at step 418, the interrogator 102 calculates the time of flight using equation (1) and the measured time sequence of the challenge signal 120, the ranging signal 132, and the RE signal 122. Finally, at step 420, the distance between the interrogator 102 and the transponder 110 is calculated based on the time of flight.

It is noted that, as an option, the waiting period associated with the step 410 may be changed by the additional time delay f(RE) in equation (2), to thereby prevent the intruder's access to the interrogator 102. The time delay f(RE) is a function of the RE signal 122 and known only to interrogator 102 and the transponder 110, but not to the intruder, providing another safety feature against unauthorized access to the interrogator 102.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A transponder of a ranging system, comprising:
    a signal receiver for receiving a challenge signal and a ranging signal from an interrogator, the ranging signal sent from the interrogator a time interval after the challenge signal;
    a signal processor for processing the challenge signal, generating a response signal in response to the challenge signal and storing the response signal; and
    a signal transmitter for sending the stored response signal in response to the ranging signal from the interrogator.

2. A transponder as recited in claim 1, wherein the time interval is known to both transponder and the interrogator.

3. A transponder as recited in claim 1, wherein the time interval is equal to or longer than a time interval required for the signal processor to process the challenge signal, generate the response signal and store the response signal.

4. A transponder as recited in claim 1, wherein the time interval is a value known only to the transponder the transponder and the interrogator.

5. A transponder as recited in claim 1, wherein the ranging signal includes a value known only to the transponder and the interrogator.

6. A transponder as recited in claim 1, wherein the signal transmitter is adapted to send a start-of-session signal before the interrogator sends the challenge signal to initiate a communication session with the interrogator.

7. A transponder as recited in claim 1, wherein the interrogator is included in a vehicle and the transponder is carried by an authorized user of the vehicle.

8. An interrogator of a ranging system, comprising:
    a signal transmitter for sending a challenge signal and, after a time interval, sending a ranging signal to a transponder;
    a signal receiver for receiving a response signal from the transponder, the responsible signal being calculable to both the interrogator and the transponder; and a signal processor for determining a time of flight based on the ranging and response signals to thereby calculate a distance between the interrogator and the transponder.

9. An interrogator as recited in claim 8, wherein the time interval is known to both transponder and the interrogator.

10. An interrogator as recited in claim 8, wherein the time interval is equal to or longer than a time interval required for the transponder to process the challenge signal and the response signal.

11. An interrogator as recited in claim 8, wherein the time interval is a function of the response signal.

12. An interrogator as recited in claim 8, wherein the interrogator is adapted to calculate an expected response signal and compare the expected response signal to the response signal received from the transponder.

13. An interrogator as recited in claim 8, wherein the time interval is a value known only to the transponder and the interrogator.

14. An interrogator as recited in claim 8, wherein the ranging signal includes a value known only to the transponder and the interrogator.

15. A ranging system, comprising:
an interrogator for sending a challenge signal and, after a time interval, sending a ranging signal; and
a transponder for receiving the challenge signal and the ranging signal, processing the challenge signal, generating a response signal in response to the challenge signal, storing the response signal and, in response to the ranging signal, sending the response signal to the interrogator,
wherein the interrogator is adapted to determine a time of flight based on the ranging and response signals to thereby calculate a distance between the interrogator and the transponder.

16. A ranging system as recited in claim 15, wherein the time interval is known to both transponder and the interrogator.

17. A ranging system as recited in claim 15, wherein the time interval is a value known only to the transponder and the interrogator.

18. A ranging system as recited in claim 15, wherein the time interval is equal to or longer than a time interval required for the transponder to process the challenge signal and the response signal.

19. A ranging system as recited in claim 15, wherein the interrogator is adapted to calculate an expected response signal.

20. A ranging system as recited in claim 15, wherein the interrogator is adapted to compare the expected response signal to the response signal sent by the transponder.

21. A ranging system as recited in claim 15, wherein the time interval is a function of the response signal.

22. A ranging system as recited in claim 15, wherein the ranging signal includes a value known only to the transponder and the interrogator.

23. A ranging system as recited in claim 15, wherein the interrogator is included in a vehicle and the transponder is carried by an authorized user of the vehicle.

24. A method for operating a ranging system, comprising:
causing a transponder to receive a challenge signal from an interrogator, to generate a response signal in response to the challenge signal and store the response signal;
causing the transponder to receive a ranging signal from the interrogator, the ranging signal transmitted from the interrogator after a lapse of a time interval from transmitting the challenging signal; and
causing the transponder to send the stored response signal to the interrogator in response to the ranging signal.

25. A method as recited in claim 24, wherein the time interval is known to both the transponder and the interrogator.

26. A method as recited in claim 24, wherein the time interval is a value known only to the transponder and the interrogator.

27. A method as recited in claim 24, wherein the time interval is equal to or longer than a time interval required for the transponder to process the challenge signal and the response signal.

28. A method as recited in claim 24, further comprising, prior to the step of receiving a challenge signal from an interrogator:
determining, by the interrogator, the time interval as a function of the response signal.

29. A method as recited in claim 24, further comprising:
causing the interrogator to calculate an expected response signal and to determine whether the expected response signal is same as the response signal from the transponder; and
causing the interrogator to determine a time of flight based on the challenge and response signals to thereby determine a distance between the interrogator and the transponder.

30. A method as recited in claim 24, further comprising:
causing the transponder to send a start-of-session signal before the interrogator sends the challenge signal to thereby initiate a communication session.

31. A method as recited in claim 24, wherein the ranging signal includes a value known only to the transponder and the interrogator.

* * * * *